United States Patent
Kajiwara et al.

(10) Patent No.: US 8,570,847 B2
(45) Date of Patent: Oct. 29, 2013

(54) RECORDING MEDIUM MANUFACTURING DEVICE AND METHOD

(75) Inventors: Yoshiyuki Kajiwara, Kanagawa (JP); Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/382,322

(22) PCT Filed: Jun. 30, 2010

(86) PCT No.: PCT/JP2010/061158
§ 371 (c)(1),
(2), (4) Date: Feb. 22, 2012

(87) PCT Pub. No.: WO2011/007670
PCT Pub. Date: Jan. 20, 2011

(65) Prior Publication Data
US 2012/0147723 A1    Jun. 14, 2012

(30) Foreign Application Priority Data
Jul. 13, 2009 (JP) .................. P2009-165145

(51) Int. Cl.
*G11B 20/10* (2006.01)
(52) U.S. Cl.
USPC .............. 369/47.21; 369/53.21; 369/59.24
(58) Field of Classification Search
USPC .......... 369/47.19–47.22, 53.21, 53.31, 53.44, 369/59.23–59.25, 275.4
See application file for complete search history.

(56) References Cited

U.S. PATENT DOCUMENTS

| | | | |
|---|---|---|---|
| 5,802,174 A * | 9/1998 | Sako et al. | 380/201 |
| 6,735,160 B1 | 5/2004 | Miyashita et al. | |
| 2002/0141317 A1 | 10/2002 | Minamino et al. | |
| 2003/0117915 A1* | 6/2003 | Minamino et al. | 369/47.22 |
| 2004/0001414 A1* | 1/2004 | Kadowaki et al. | 369/59.24 |
| 2005/0089162 A1* | 4/2005 | Kobayashi | 380/44 |
| 2005/0122889 A1 | 6/2005 | Kobayashi et al. | |
| 2005/0144470 A1* | 6/2005 | Takashima et al. | 713/189 |
| 2005/0174909 A1* | 8/2005 | Horigome et al. | 369/53.21 |

FOREIGN PATENT DOCUMENTS

| | | |
|---|---|---|
| JP | 2001-357533 A | 12/2001 |
| JP | 2004-213781 A | 7/2004 |
| WO | WO 02/21518 A1 | 3/2002 |

* cited by examiner

*Primary Examiner* — Thang Tran
(74) *Attorney, Agent, or Firm* — Wolf, Greenfield & Sacks, P.C.

(57) ABSTRACT

An information recording processing constitution realizing both readout difficulty and high-precision readout is provided. Superimposition recording of highly secret additional information such as a cryptographic key in a groove signal recorded on a disk, which superimposition recording realizes both readout difficulty and high-precision readout, can be performed. The groove signal to which a phase error corresponding to a bit value is set is recorded at a time of recording of the additional information, and at a time of readout of the additional information, the phase error of the groove signal in a predetermined section is subjected to an integrating process and the direction of the phase error of the groove signal within each section is determined. The recording and reproduction of the additional information for increasing readout difficulty and realizing high-precision readout is realized by such processes.

4 Claims, 12 Drawing Sheets

FIG. 7
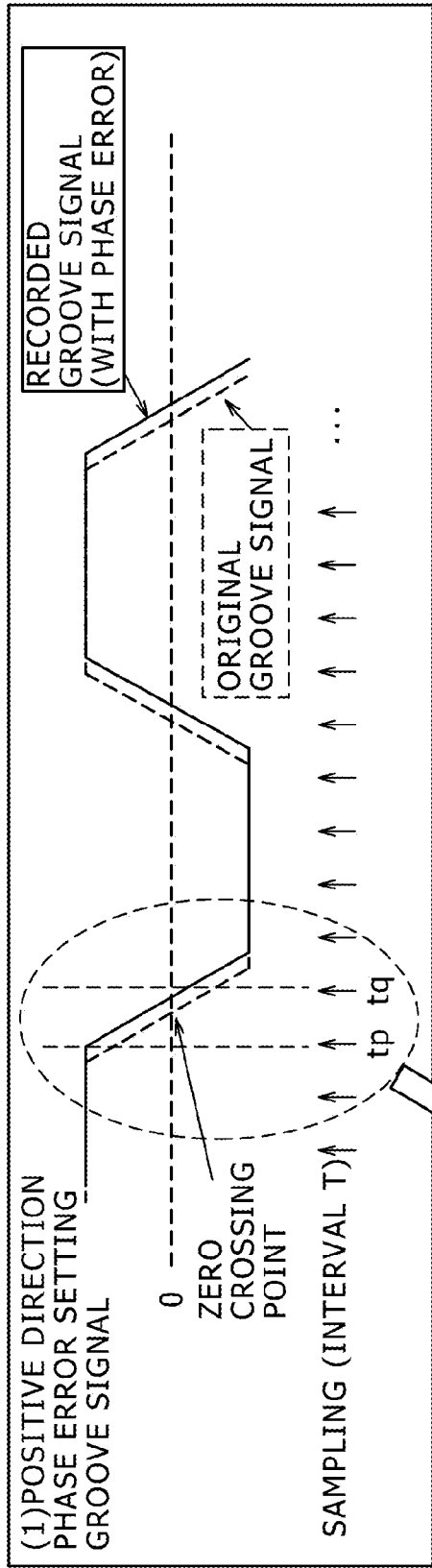
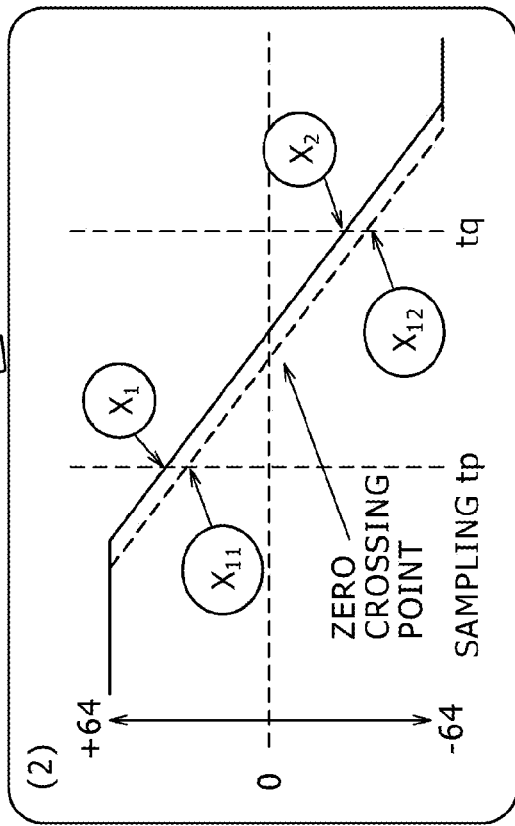
(3) PHASE ERROR CALCULATING EQUATION
$\Delta\tau = ((Y_k)(X_{k-1})) - ((Y_{k-1})(X_k))$
$TH1 < \Sigma \Delta\tau < Th2 \rightarrow$ NO PHASE ERROR
$\Sigma \Delta\tau \leqq Th1 \rightarrow$ WITH PHASE ERROR IN POSITIVE DIRECTION
$\Sigma \Delta\tau \geqq Th2 \rightarrow$ WITH PHASE ERROR IN NEGATIVE DIRECTION
WHERE
Y IS Y = (+1) WHEN X $\geqq$ 0
Y IS Y = (-1) WHEN X < 0

US 8,570,847 B2

RECORDING MEDIUM MANUFACTURING DEVICE AND METHOD

TECHNICAL FIELD

The present invention relates to an information recording device, an information reproducing device, a recording medium manufacturing device, an information recording medium, a method, and a program, and particularly to an information recording device, an information reproducing device, a recording medium manufacturing device, an information recording medium, a method, and a program in which additional information such as a content key is superimposed on a groove signal to be recorded as additional information such as recording conditions for a disk (information recording medium), and is recorded or reproduced.

BACKGROUND ART

It is known that a meandering, or wobbling, groove in an optical disk is used as address information for a data recording track and additional information such as recording conditions. This wobbling groove is used to set a pickup to a desired track position and record data on a track or reproduce data from the track.

On the other hand, recently, illegal copying of contents recorded on optical disks has become a problem, and there has been a desire for robust contents protection systems (CPS: Contents Protection System) for a purpose of protecting the contents.

There is a method of encrypting contents to be stored on a disk as one of contents protection systems (CPS). A constitution has been proposed in which key information applied to the decryption of encrypted contents, other content use control information, and the like are recorded in a state of being superimposed on address information in the above-described groove. Patent Document 1 (Japanese Patent Laid-Open No. 2004-213781), for example, discloses a constitution in which key information is recorded in a groove and used.

However, the key information applied to the decryption of the encrypted contents, the other content use control information, and the like are often secret information, and needs to be prevented from being read easily for leakage prevention. On the other hand, when key data is recorded on a disk, the reproducing device of a user having a legitimate right to the use of contents needs to read key constituent bits correctly. This is because when readout precision is decreased, the correct key information cannot be obtained, and the contents cannot be decrypted.

When the key information applied to the decryption of contents is recorded in the above-described groove, for example, it is necessary to satisfy conflicting needs to avoid easy readout and to realize correct readout.

Requirements for a constitution in which CPS data such as key information as application data in a contents protection system (CPS) is recorded on a disk and used include for example the following requirements.

1. High reliability of a reproduced signal of the CPS data.
2. Difficulty in copying the CPS data to another medium.
3. The cost of manufacturing the CPS data storage medium and a recording and reproducing drive is not greatly increased.

There are such requirements, for example.

Patent Document 1 (Japanese Patent Laid-Open No. 2004-213781) described above discloses a constitution in which key information is recorded in a groove and used. This conventional technique is also devised to satisfy the above requirements. However, in the meantime, techniques for deciphering secret information have progressed. A recording constitution providing a high degree of confidentiality is desired.

PRIOR ART DOCUMENTS

Patent Documents

Patent Document 1: Japanese Patent Laid-Open No. 2004-213781

SUMMARY OF INVENTION

Technical Problem

The present invention has been made in view of the above problems, for example, and it is an object of the present invention to provide an information recording device, an information reproducing device, a recording medium manufacturing device, an information recording medium, a method, and a program that increase difficulty in decipherment and which also enable correct data readout in a constitution in which additional information such as a cryptographic key for contents recorded on a disk is superimposed on a groove signal, and is recorded or reproduced.

Technical Solution

According to a first aspect of the present invention, there is provided a recording medium manufacturing device including:

a recording signal generating section configured to generate a groove signal for recording additional information; and a recording section configured to record the recording signal generated by the recording signal generating section onto a master disk;

wherein the recording signal generating section determines a phase error setting mode corresponding to each bit value constituting the additional information, and the recording signal generating section generates the recording signal to which a phase error corresponding to each bit value constituting the additional information is set in a predetermined section unit of the recording signal.

Further, in one embodiment of the recording medium manufacturing device according to the present invention, the recording signal generating section generates the recording signal in which a direction or a combination of directions of the phase error set in the groove signal is set in different modes according to a case of a bit value of the additional information being zero and a case of the bit value of the additional information being one.

Further, in one embodiment of the recording medium manufacturing device according to the present invention, the additional information is information including a cryptographic key applied to a process of encrypting contents to be recorded on the disk or a process of decrypting the contents.

Further, according to a second aspect of the present invention, there is provided an information reproducing device including:

a reproducing section configured to read a groove signal recorded on a disk; and a signal analyzing section configured to analyze a reproduced signal of the reproducing section;

wherein the signal analyzing section determines a direction of a phase error included in the groove signal in a unit of a predetermined signal section, and on a basis of a determination result, determines a constituent bit value of additional information included in the groove signal.

Further, in one embodiment of the information reproducing device according to the present invention, the signal analyzing section calculates a phase error index value using detected values at sampling points before and after a zero crossing point of the groove signal, and determines the set direction of the phase error in the predetermined signal section by comparing a result obtained by integrating the phase error index value in the unit of the predetermined signal section with a threshold value set in advance.

Further, in one embodiment of the information reproducing device according to the present invention, the information reproducing device further includes a decryption processing section configured to decrypt encrypted contents recorded on the disk by applying a cryptographic key included in the additional information analyzed by the signal analyzing section.

Further, according to a third aspect of the present invention, there is provided an information recording device including:

a reproducing section configured to read a groove signal recorded on a disk;

a signal analyzing section configured to determine a direction of a phase error included in the groove signal read from the disk in the reproducing section in a unit of a predetermined signal section, and analyze a cryptographic key recorded so as to be superimposed on the groove signal by a bit value determining process based on a determination result;

an encryption processing section configured to encrypt contents by applying the cryptographic key analyzed by the signal analyzing section; and a recording section configured to record the encrypted contents generated by the encryption processing section onto the disk.

Further, in one embodiment of the information recording device according to the present invention, the signal analyzing section calculates a phase error index value using detected values at sampling points before and after a zero crossing point of the groove signal, and determines the set direction of the phase error in the predetermined signal section by comparing a result obtained by integrating the phase error index value in the unit of the predetermined signal section with a threshold value set in advance.

Further, according to a fourth aspect of the present invention, there is provided an information recording medium on which a groove signal used to record additional information is recorded, wherein the groove signal is recorded as an additional information superimposition signal to which a phase error in a different mode according to a constituent bit value of the additional information is set in a unit of a predetermined signal section, and the additional information is readable on a basis of detection of the set mode of the phase error in a reproducing device.

Further, in one embodiment of the information recording medium according to the present invention, the groove signal is a signal in which a direction or a combination of directions of the phase error set in the groove signal is set in different modes according to a case of a bit value of the additional information being zero and a case of the bit value of the additional information being one.

Further, in one embodiment of the information recording medium according to the present invention, the additional information is information including a cryptographic key applied to a process of encrypting contents to be recorded on the disk or a process of decrypting the contents.

Further, according to a fifth aspect of the present invention, there is provided an information recording medium manufacturing method performed in a recording medium manufacturing device, the information recording medium manufacturing method including:

a recording signal generating step of a recording signal generating section generating a groove signal for recording additional information; and a recording step of a recording section recording the recording signal generated in the recording signal generating step onto a master disk;

wherein the recording signal generating step includes a step of determining a phase error setting mode corresponding to each bit value constituting the additional information, and a step of generating the recording signal to which a phase error corresponding to each bit value constituting the additional information is set in a predetermined section unit of the recording signal.

Further, according to a sixth aspect of the present invention, there is provided an information reproducing method performed in an information reproducing device, the information reproducing method including:

a reproducing step of a reproducing section reading a groove signal recorded on a disk; and a signal analyzing step of a signal analyzing section analyzing a reproduced signal in the reproducing step;

wherein the signal analyzing step includes a step of determining a direction of a phase error included in the groove signal in a unit of a predetermined signal section, and on a basis of a determination result, determining a constituent bit value of additional information included in the groove signal.

Further, according to a seventh aspect of the present invention, there is provided an information recording method performed in an information recording device, the information recording method including:

a reproducing step of a reproducing section reading a groove signal recorded on a disk;

a signal analyzing step of a signal analyzing section determining a direction of a phase error included in the groove signal read from the disk in the reproducing step in a unit of a predetermined signal section, and analyzing constituent bit information of a cryptographic key recorded so as to be superimposed on the groove signal by a bit value determining process based on a determination result;

an encryption processing step of an encryption processing section encrypting contents by applying the cryptographic key analyzed in the signal analyzing step; and a recording step of a recording section recording the encrypted contents generated in the encryption processing step onto the disk.

Further, according to an eighth aspect of the present invention, there is provided a program for making an information reproducing process performed in an information reproducing device, the program including:

a reproducing step of making a reproducing section read a groove signal recorded on a disk; and a signal analyzing step of making a signal analyzing section analyze a reproduced signal in the reproducing step;

wherein the signal analyzing step includes a step of effecting determination of a direction of a phase error included in the groove signal in a unit of a predetermined signal section, and on a basis of a determination result, determination of a constituent bit value of additional information included in the groove signal.

Further, according to a ninth aspect of the present invention, there is provided a program for making an information recording process performed in an information recording device, the program including:

a reproducing step of making a reproducing section read a groove signal recorded on a disk;

a signal analyzing step of making a signal analyzing section determine a direction of a phase error included in the groove signal read from the disk in the reproducing step in a unit of a predetermined signal section, and analyze constituent bit information of a cryptographic key recorded so as to be superimposed on the groove signal by a bit value determining process based on a determination result;

an encryption processing step of making an encryption processing section encrypt contents by applying the cryptographic key analyzed in the signal analyzing step; and a recording step of making a recording section record the encrypted contents generated in the encryption processing step onto the disk.

Incidentally, the program according to the present invention is for example a program that can be provided to image processing devices and computer systems capable of executing various program codes by a storage medium provided in a computer readable format or a communication medium. Such a program is provided in a computer readable format, whereby processing corresponding to the program is realized on the image processing devices and the computer systems.

Other and further objects, features, and advantages of the present invention will become apparent from more detailed description on the basis of embodiments of the present invention and the accompanying drawings to be described later. Incidentally, a system in the present specification is a logical set configuration of a plurality of devices, and is not limited to a system in which the devices of respective configurations are within an identical casing.

Advantageous Effect

According to one embodiment of the present invention, superimposition recording of highly secret additional information such as a cryptographic key in a groove signal recorded on a disk, which superimposition recording realizes both readout difficulty and high-precision readout, can be performed. The groove signal to which a phase error corresponding to a bit value is set is recorded at a time of recording of the additional information, and at a time of readout of the additional information, the phase error of the groove signal in a predetermined section is subjected to an integrating process and the direction of the phase error of the groove signal within each section is determined. The recording and reproduction of the additional information for increasing readout difficulty and realizing high-precision readout can be realized by such processes.

BRIEF DESCRIPTION OF DRAWINGS

FIG. 7 is a diagram of assistance in explaining an example of a process of obtaining additional information by signal analysis processing on a groove signal which processing is performed by the information reproducing device according to one embodiment of the present invention.

MODE FOR CARRYING OUT THE INVENTION

Details of an information recording device, an information reproducing device, a recording medium manufacturing device, an information recording medium, a method, and a program according to the present invention will hereinafter be described with reference to the drawings. Description will be made according to the following headings.

1. Configuration and Processes of Recording Medium Manufacturing Device and Information Recording Medium
2. Configuration and Processes of Information Reproducing Device
3. Configuration and Processes of Information Recording Device
4. Other Embodiments 1. Configuration and Processes of Recording Medium Manufacturing Device and Information Recording Medium The configuration and processes of a recording medium manufacturing device and an information recording medium according to an embodiment of the present invention will first be described with reference to FIG. 1 and subsequent figures.

Figure 1:
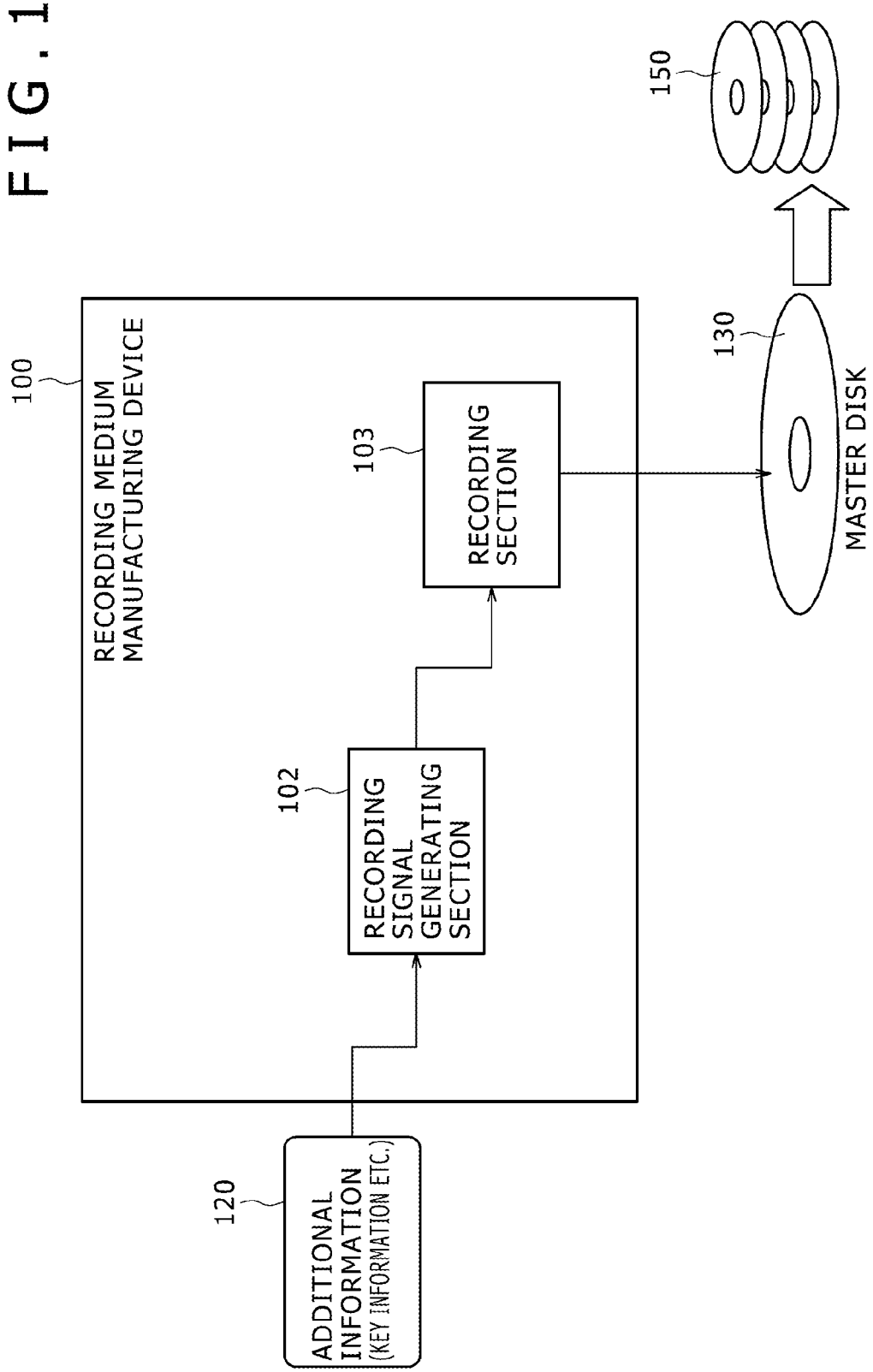
FIG. 1 is a diagram of assistance in explaining an example of configuration of a recording medium manufacturing device according to one embodiment of the present invention.

FIG. 1 is a block diagram showing the configuration of a recording medium manufacturing device according to an embodiment of the present invention. The recording medium manufacturing device 100 manufactures a master disk 130 as a disk master. Thereafter, disks 150 as an information recording medium to be provided to users are mass-produced by a stamper process for the master disk 130.

A groove signal used to record additional information such as recording conditions and the like is recorded on the master disk 130. The groove signal is formed by a meandering, or wobbling, groove.

As shown in FIG. 1, the recording medium manufacturing device 100 is supplied with additional information 120 such as recording conditions, for example additional information 120 such as a cryptographic key, and generates a recording signal. A process of recording the groove signal onto the master disk 130 is performed according to the generated recording signal.

The additional information 120 is data including constituent bits of a cryptographic key, such as 64 bits or 128 bits. This additional information 120 is input to a recording signal generating section 102.

The recording signal generating section 102 is supplied with the additional information 120 such as the recording conditions, and generates the recording signal (groove signal) to be recorded on the master disk 130. The recording signal generating section 102 generates a wobbling groove signal indicating the additional information such as the recording conditions by an FM (Frequency Modulation) modulation process. The additional information such as the recording conditions is recorded by setting a phase error to the groove signal (FM modulated signal). This process will be described later in detail.

The recording signal generated by the recording signal generating section 102 is output to a recording section 103. The recording section 103 forms a groove according to the recording signal in the master disk 130 by laser output, for example. The groove signal recorded on the master disk 130 is a groove in the form of a spiral along a data track where contents are recorded.

The master disk 130 on which the groove signal having the additional information such as the recording conditions and the like, for example the cryptographic key, superimposed thereon is recorded is manufactured by a recording process by the recording section 103. Large amounts of disks 150 to be provided to users are produced by a stamper process for the master disk 130.

Incidentally, the disks 150 may be either of disks on which contents of a movie, for example, are recorded or disks on which no contents are recorded. The disks on which no contents are recorded allow data to be written thereon by a user. A user who has purchased such a disk 150 can later record contents of a movie or the like onto the disk 150.

For example, the user who has purchased the disk on which no contents are recorded connects to a content providing server via a network using a recording and reproducing device such as a PC of the user. The server provides encrypted contents that can be decrypted by using a cryptographic key recorded on the disk 150 to a user device.

The user device records the contents downloaded from the server onto the disk 150. Thereafter, at the time of a content reproducing process, the cryptographic key is read from a groove signal recorded on the disk 150, and a process of decrypting the encrypted contents recorded on the disk 150 is performed using the read cryptographic key, so that the content reproducing process can be performed.

Alternatively, it is possible to obtain unencrypted contents from a server, perform a process of encrypting the obtained contents by applying the cryptographic key read from the groove signal on the disk on the side of the user device, and record the contents onto the disk.

In either mode, the encrypted contents and the cryptographic key applied to the decryption of the encrypted contents are stored en bloc on one disk. Thus, even when the encrypted contents are output and copied to another medium, for example, the cryptographic key cannot be used. Therefore, unauthorized use of the contents can be prevented effectively.

The configuration and processes of the recording signal generating section 102 in the recording medium manufacturing device 100 will next be described in detail with reference to FIG. 2. As described above, the recording signal generating section 102 generates a recording signal including the cryptographic key and the like as the additional information such as the recording conditions and the like.

Figure 2:
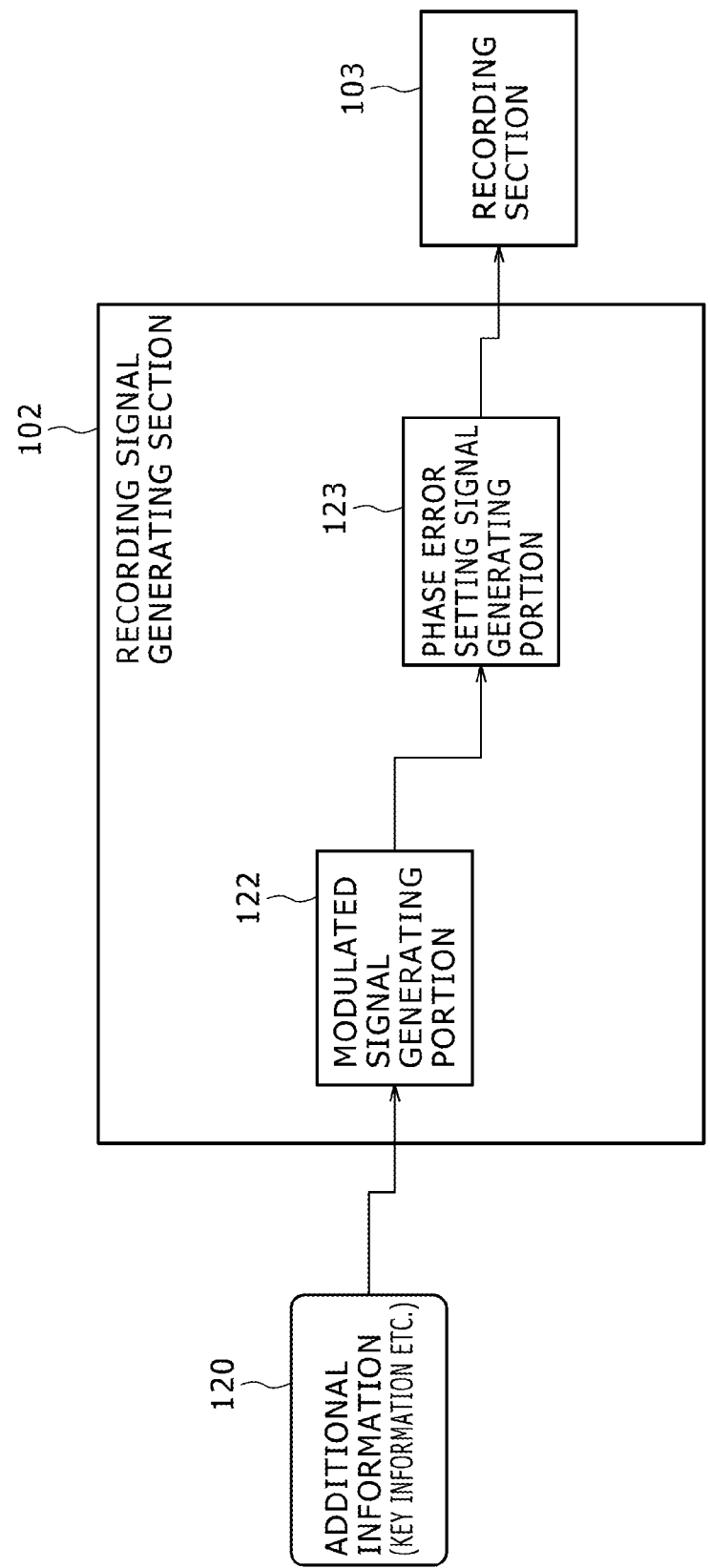
FIG. 2 is a diagram of assistance in explaining an example of configuration of a recording signal generating section in the recording medium manufacturing device according to one embodiment of the present invention.

As shown in FIG. 2, the recording signal generating section 102 includes a modulated signal generating portion 122 and a phase error setting signal generating portion 123.

The recording signal generating section 102 for example generates a phase error setting signal that associates a phase error in a positive direction with the groove signal when a constituent bit of the additional information is [1] and which associates a phase error in a negative direction with the groove signal when a constituent bit of the additional information is [0].

Incidentally, this setting can be changed to various settings, including a setting opposite from the above and the following settings:

a combination of settings of a preceding phase error in the positive direction and a succeeding phase error in the negative direction in the case of a bit [1]; and a combination of settings of a preceding phase error in the negative direction and a succeeding phase error in the positive direction in the case of a bit [0].

Various settings, including such settings, are possible.

The modulated signal generating portion 122 generates a modulated signal by performing the FM modulation process according to the additional information such as the recording conditions.

The phase error setting signal generating portion 123 generates a recording signal by setting a phase error to the modulated signal generated by the modulated signal generating portion 122 according to phase error information corresponding to an additional information bit.

Figure 3:
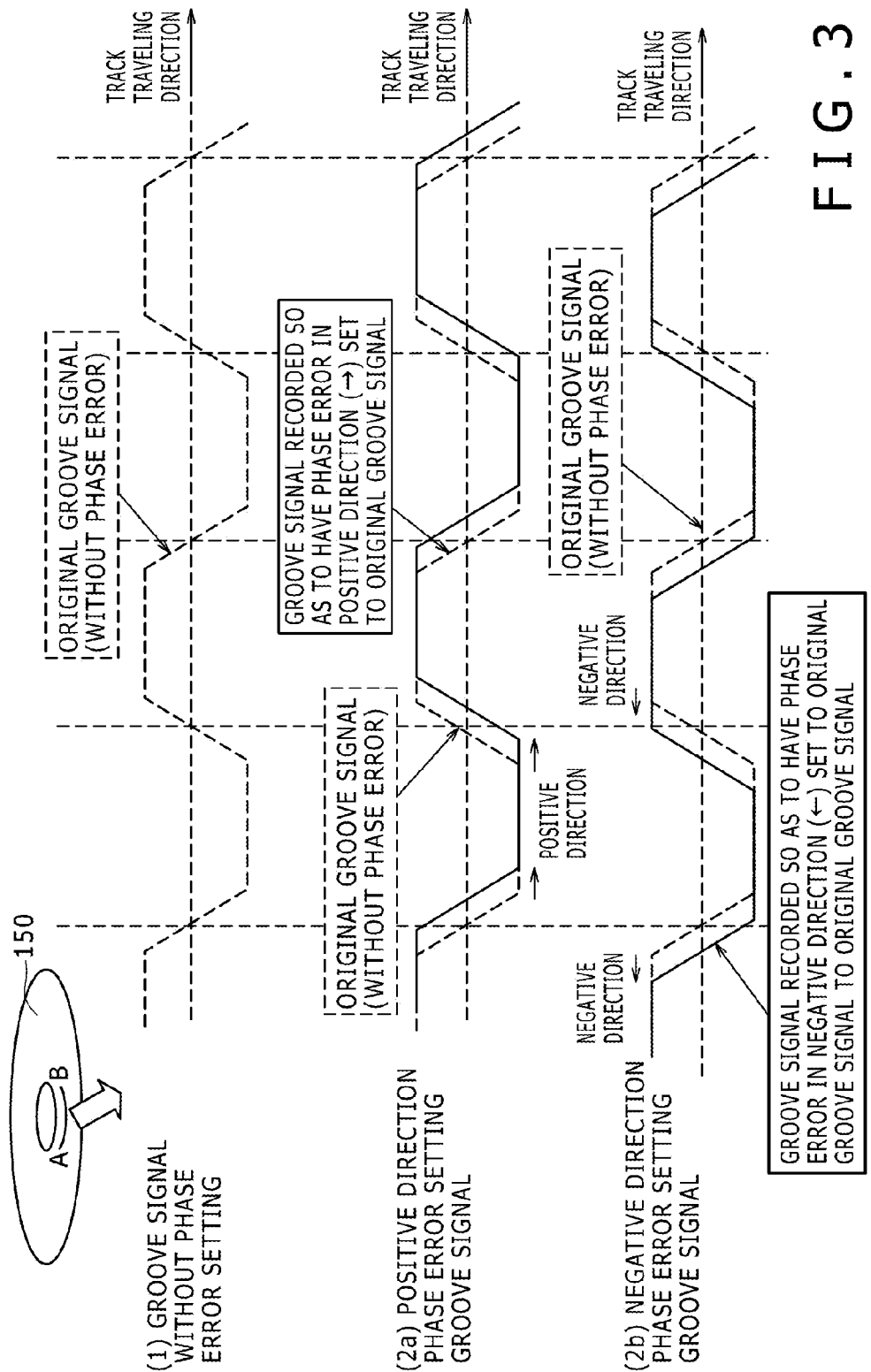
FIG. 3 is a diagram of assistance in explaining an example of phase error setting groove signals according to one embodiment of the present invention.

FIG. 3 shows examples of the groove signal recorded on the master disk and the disk 150. The groove signal is a signal obtained by reproducing the groove set in the form of a spiral in the disk 150. FIGS. 2(1), 2(2a), and 2(2b) show details of a part of the groove signal. That is, FIGS. 2(1), 2(2a), and 2(2b) show examples of the groove signal in a section AB of the disk 150 shown in FIG. 2.

FIG. 3 shows the following signal examples:

(1) a groove signal without a phase error setting (2a) a positive direction phase error setting groove signal (2b) a negative direction phase error setting groove signal (1), (2a), and (2b) correspond to the flat surface of the disk, and a right direction is the direction of a signal on the track. The groove signal without a phase error setting which groove signal is shown in FIG. 3(1) is represented by a dotted line in FIGS. 3(2a) and 3(2b). A solid line shown in FIGS. 3(2a) and 3(2b) represents the groove signal having a phase error, and the dotted line represents the original groove signal without a phase error, the original groove signal being formed from only the additional information such as the recording conditions.

In the example shown in FIG. 3(2a), the positive direction phase error setting groove signal represented by the solid line is slightly shifted in a track traveling direction (positive direction) as compared with the groove signal represented by the dotted line (no phase error). This shift is a positive direction phase error.

In addition, in the example shown in FIG. 3(2b), the negative direction phase error setting groove signal represented by the solid line is slightly shifted in a track reverse direction (negative direction) as compared with the groove signal represented by the dotted line (no phase error). This shift is a negative direction phase error.

The groove signal recorded on the master disk and the disk is set such that groove signals of the different types of FIGS. 3(1), 3(2a), and 3(2b) are mixed with each other. A constituent bit of additional information such as key information is recorded by a phase error. A reproducing device detects a phase error from the groove signal in reading the groove signal, and analyzes a bit value of the additional information on the basis of the detected phase error. An example of settings of concrete phase errors and an example of correspondences of the phase errors with bit data will be described with reference to FIG. 4.

Figure 4:
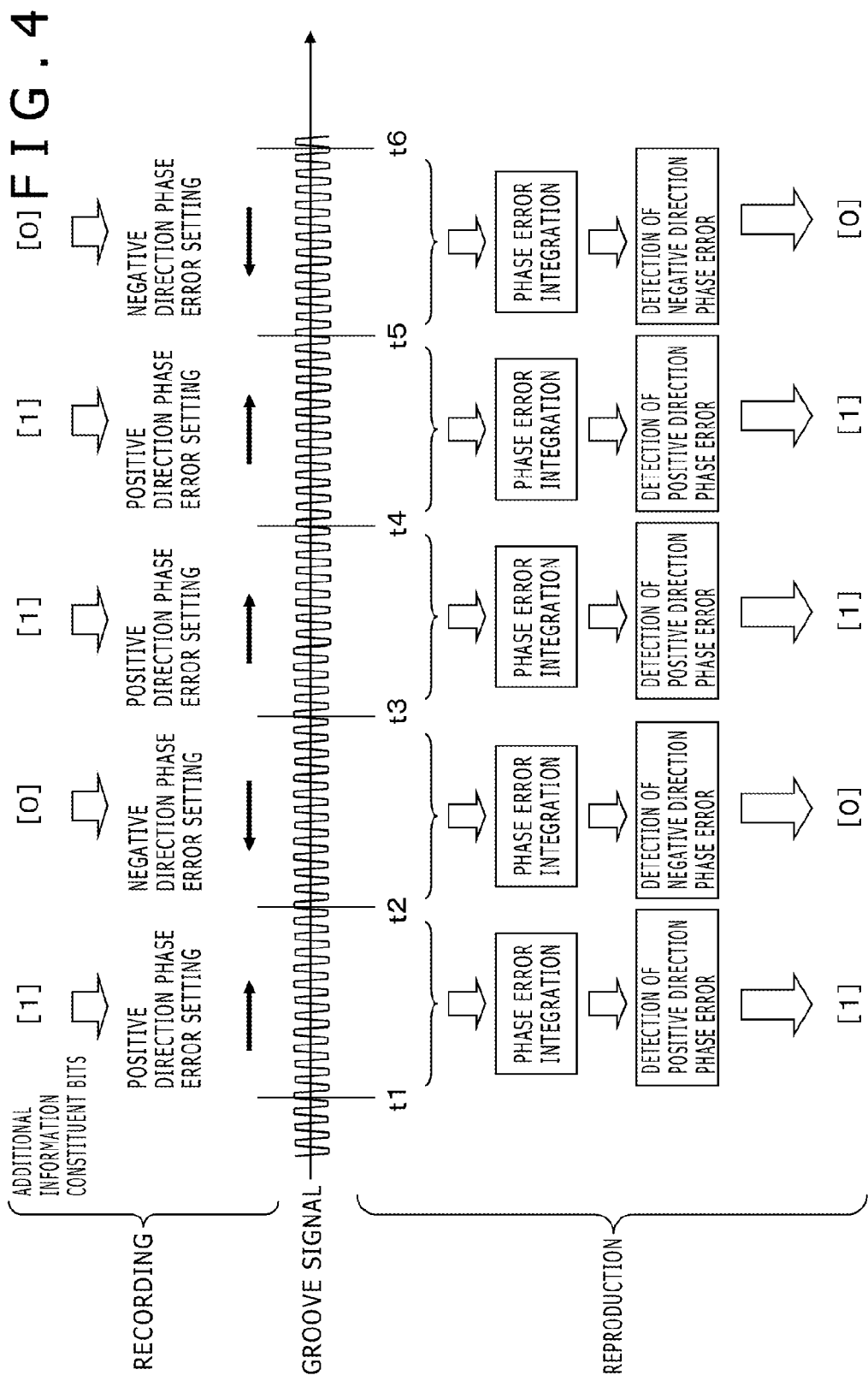
FIG. 4 is a diagram of assistance in explaining an example of a process of recording a phase error setting groove signal and a process of reproducing the phase error setting groove signal according to one embodiment of the present invention.

FIG. 4 is a diagram showing an example of a process of recording the groove signal and a process of reproducing the groove signal. The example of FIG. 4 represents an example in which the groove signal is recorded with settings as follows:

a groove signal to which a phase error in the positive direction is set in the case of a bit=1; and a groove signal to which a phase error in the negative direction is set in the case of a bit=0.

In a process of recording the groove signal, in the case of an additional information constituent bit=1, a groove signal to which a phase error in the positive direction (track traveling direction) is set is recorded in a predetermined section. In the case of an additional information constituent bit=1, a groove signal to which a phase error in the negative direction (track reverse direction) is set is recorded in a predetermined section.

In the example shown in FIG. 4, the groove signal is generated and recorded with settings as follows:

t1 to t2: a positive direction phase error setting groove signal (corresponding to a bit value=1)

t2 to t3: a negative direction phase error setting groove signal (corresponding to a bit value=0)

t3 to t4: a positive direction phase error setting groove signal (corresponding to a bit value=1)

t4 to t5: a positive direction phase error setting groove signal (corresponding to a bit value=1)

t5 to t6: a positive direction phase error setting groove signal (corresponding to a bit value=0)

Incidentally, the set phase errors are very slight errors. For example, a phase error of about 1% to 5% of the period T of a sampling signal in a reproducing process is set. Thus, with such settings, it is difficult to determine whether a set phase error is in the positive direction or the negative direction on the basis of readout performed once.

In a process of recording the groove signal, in the case where an additional information constituent bit has a bit value=1, for example, a groove signal having a phase error in the positive direction is set and recorded in a certain section. In addition, in the case of a bit=0, for example, a groove signal having a phase error in the negative direction is set and recorded in a certain section.

A reproducing device reads the groove signal at predetermined sampling time (T) intervals, and accumulates (integrates) the value of the signal read at each sampling time. The direction (positive or negative) of the phase error of the groove signal read in a certain section (for example t1 to t2) is determined by the integrating process.

Incidentally, either of a recording device and a reproducing device sets various control timings on the basis of a clock set in the device, and is able to determine a section such as t1 to t2 or the like shown in FIG. 4 on the basis of a clock count specified in advance.

As described with reference to FIG. 3, signals of the following three patterns are recorded on the disk.

(1) a groove signal without a phase error setting (2a) a positive direction phase error setting groove signal (2b) a negative direction phase error setting groove signal A groove signal is recorded with the setting of one of the above three patterns in a unit of a certain section, for example a unit of a certain section such as t1 to t2, t2 to t3, or the like shown in FIG. 4.

The reproducing device analyzes a phase error in a unit of a certain section such as t1 to t2, t2 to t3, or the like shown in FIG. 4. Different phase error accumulation signals (integration signals) corresponding to the above three patterns can be generated by this analysis. By such a phase error accumulating process, that is, a detection signal integrating process, it is possible to detect correctly whether the set phase error is in the positive direction or in the negative direction.

This process is shown in a lower part of FIG. 4. For example, the reproducing device performs the following process.

t1 to t2: Results of determination of a phase error on the basis of the read groove signal are accumulated (integrated), it is determined that a phase error in the positive direction is set in the section, and it is determined that a bit value=[1].

t2 to t3: Results of determination of a phase error on the basis of the read groove signal are accumulated (integrated), it is determined that a phase error in the negative direction is set in the section, and it is determined that a bit value=[0].

A similar process is thereafter performed to obtain the values of bits sequentially.

By continuing this process, all of bit values constituting a key of 64 bits or 128 bits, for example, can be obtained correctly.

2. Configuration and Processes of Information Reproducing Device

Description will next be made of an example of the configuration and processes of the reproducing device that reproduces the disk on which the groove signal having the above-described additional information superimposed thereon is recorded.

Figure 5:
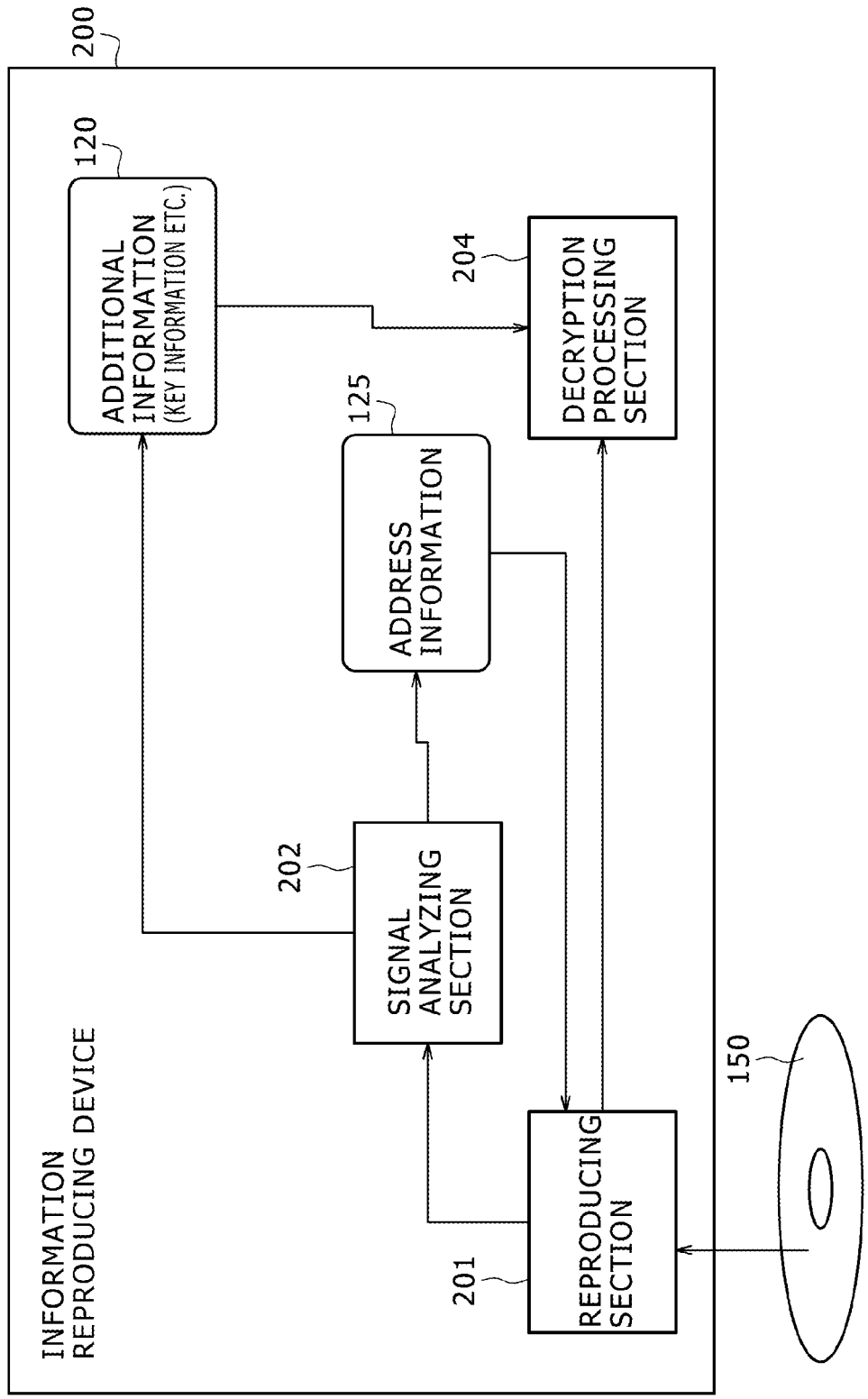
FIG. 5 is a diagram of assistance in explaining an example of configuration of an information reproducing device according to one embodiment of the present invention.

FIG. 5 is a block diagram showing an example of configuration of an information reproducing device according to an embodiment of the present invention. As shown in FIG. 5, the information reproducing device 200 includes a reproducing section 201, a signal analyzing section 202, and a decryption processing section 204.

The reproducing section 201 performs signal readout from the disk 150. The disk 150 is a disk having a groove signal recorded thereon with additional information such as a cryptographic key as described above superimposed on the groove signal. Encrypted contents encrypted by the cryptographic key are further recorded.

The reproducing section 201 reads the groove signal, and outputs the groove signal to the signal analyzing section 202. As described earlier with reference to FIG. 3 and the like, the groove signal is a groove signal in which signals of the following three patterns are mixed with each other.

(1) a groove signal without a phase error setting
(2a) a positive direction phase error setting groove signal
(2b) a negative direction phase error setting groove signal The signal analyzing section 202 demodulates and analyzes the groove signal input from the reproducing section 201, detects a phase error, and detects a constituent bit value of the additional information recorded in the groove signal on the basis of the detected phase error.

Additional information 120 is obtained on the basis of the constituent bit information of the additional information detected in the signal analyzing section 202. For example, the additional information 120 is a cryptographic key, and is applied to a process of decrypting the encrypted contents recorded on the disk 150.

In addition, other additional information, for example address information 125 included in the groove signal is obtained from a result of the demodulation in the signal analyzing section 202. Incidentally, phase errors set in the groove signal are slight phase errors, as described above, and do not produce an effect to such a degree as to cause errors in the obtained address information. Incidentally, a process of obtaining the other additional information, for example the address information 125 included in the groove signal is performed as an ordinary groove signal reading process. For example, FM demodulation processing on a push-pull signal obtained as a groove signal readout signal is performed, band-pass filter processing and binarization processing are performed on a result of the demodulation processing, processing such as ECC decoding and deinterleaving is further performed as required, and the other additional information, for example the address information 125 and basic information on the disk (a disk type, a write strategy parameter, and the like) included in the groove signal is obtained.

Incidentally, in reading the contents recorded on a data track, a pickup is set at a predetermined track position by applying address information in a data region, for example, and the encrypted contents are read. The decryption processing section 204 performs a process of decrypting the encrypted contents by applying the additional information (cryptographic key) 120 obtained from the groove signal, and reproduces the contents.

A detailed configuration and processes of the signal analyzing section 202 will be described with reference to FIG. 6.

Figure 6:
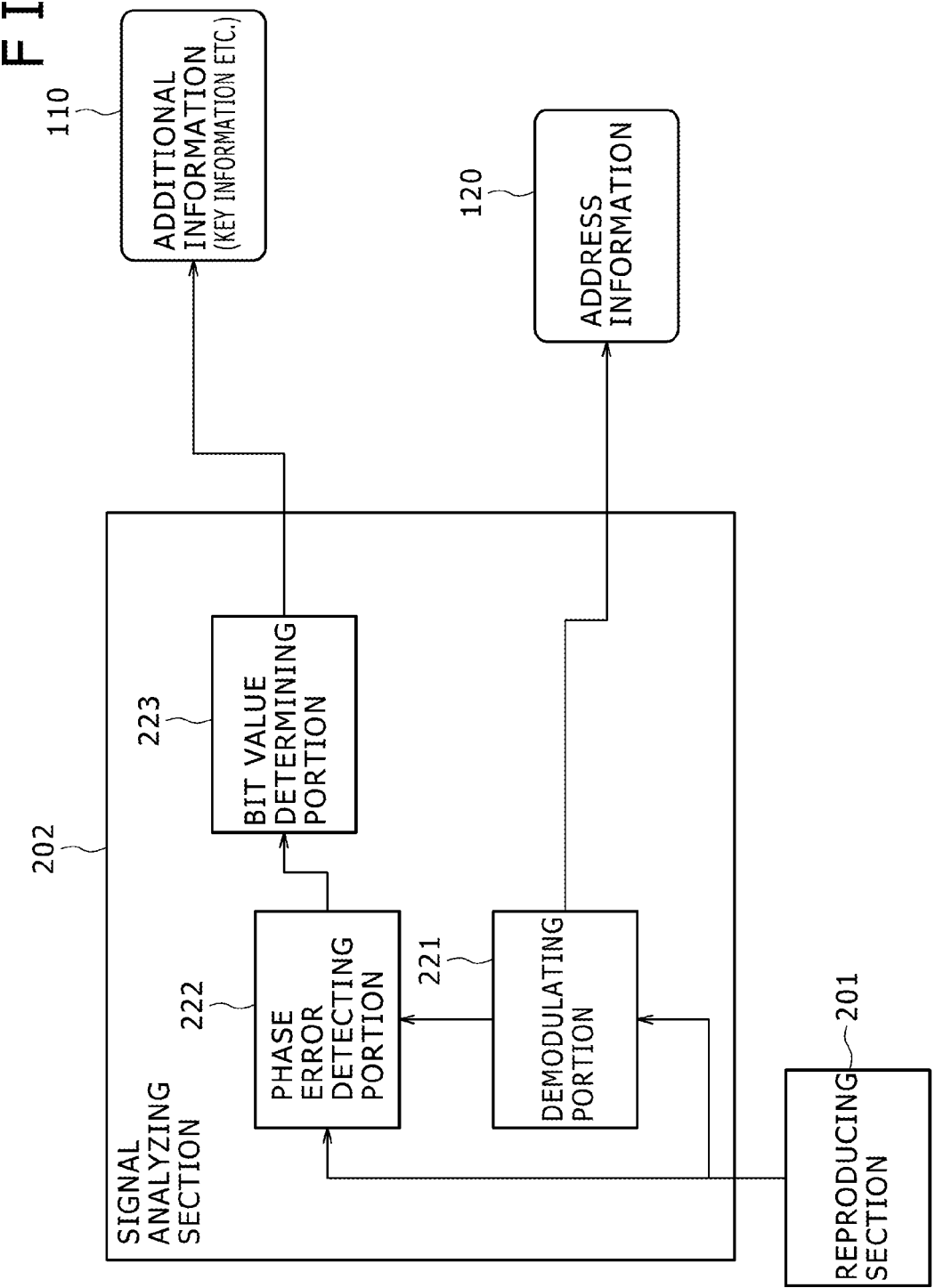
FIG. 6 is a diagram of assistance in explaining an example of a detailed configuration of a signal analyzing section in the information reproducing device according to one embodiment of the present invention.

As shown in FIG. 6, the signal analyzing section 202 includes a demodulating portion 221, a phase error detecting portion 222, and a bit value determining portion 223.

The demodulating portion 221 is supplied with the groove signal recorded on the disk as an FM modulated signal from the reproducing section 201, and performs a demodulating process.

The phase error detecting portion 222 reads the groove signal at predetermined sampling time (T) intervals, and accumulates (integrates) the value of the signal read at each sampling time, as described earlier with reference to FIG. 4. Incidentally, the integrating process is performed as a process of integrating the push-pull signal obtained from the groove signal readout signal, for example. The direction (positive or negative) of the phase error of the groove signal read in a certain section (for example t1 to t2) is determined by the integrating process.

As described with reference to FIG. 3, signals of the following three patterns are recorded on the disk.

(1) a groove signal without a phase error setting
(2a) a positive direction phase error setting groove signal
(2b) a negative direction phase error setting groove signal The phase error detecting portion 222 in the information reproducing device determines which of the error settings of the above three patterns is made to the groove signal in a unit of a certain section such as t1 to t2, t2 to t3, or the like shown in FIG. 4, for example.

A concrete example of a phase error detecting process performed by the phase error detecting portion 222 will be described with reference to FIG. 7 and following figures.

FIG. 7(1) shows an example of a groove signal similar to that described earlier with reference to FIG. 3(2a). The groove signal to which a phase error is set in the positive direction (track traveling direction) is indicated by a solid line. A dotted line indicates a groove signal without a phase error for reference.

The groove signal is read by the reproducing device at sampling intervals of a certain period. A plurality of upward arrows shown in FIG. 7(1) indicate sampling timing. The groove signal is read at intervals T from a left to a right.

Sampling data before and after a zero crossing point of the groove signal is used to detect a phase error. The zero crossing point refers to a point at which the line of the groove signal crosses a central position (0), as shown in FIG. 7.

Two pieces of sampling data at sampling times before and after the zero crossing point, that is, times tp and tq shown in FIG. 7 are used for phase error detection.

Details of this process will be described with reference to FIGS. 7(2) and 7(3).

FIG. 7(2) is an enlarged view showing in enlarged dimension the neighborhood of the sampling times tp and tq shown in FIG. 7(1). A solid line indicates the groove signal having a phase error in the positive direction. A dotted line indicates the groove signal without a phase error as reference data.

Two pieces of sampling data at the sampling times tp and tq on both sides of the zero crossing point shown in FIG. 7(2) are used for phase error detection.

For example, in an example shown in FIG. 7(2), the following measured values are obtained:
sampling time tp: a measured value $X_1$; and
sampling time tq: a measured value $X_2$.

Incidentally, the measured values are obtained as relative potential (voltage) values corresponding to groove positions. For example, the measured values are measured in a range of −64 to +64 as relative potential values from an extreme to an extreme of the groove signal, as shown in FIG. 7(2).

A phase error index value ($\Delta\tau$) is calculated by applying the measured values $X_1$ and $X_2$ at the two sampling times tp and tq sandwiching the zero crossing point and applying an equation shown in FIG. 7(3), for example.

Specifically, the phase error index value ($\Delta\tau$) is calculated according to the following equation (Equation 1).

$$\Delta\tau = ((Y_k)(X_{k-1})) - ((Y_{k-1})(X_k)) \tag{Equation 1}$$

where
$X_{k-1}$ is the measured value immediately before the zero crossing point,
$X_k$ is the measured value immediately after the zero crossing point, and
$Y_{k-1}$ and $Y_k$ are
$Y=(+1)$ when $X \geq 0$ or
$Y=(-1)$ when $X<0$.

The above equation (Equation 1) is an equation for calculating the phase error index value ($\Delta\tau$) corresponding to one zero crossing point. As described above, a phase error set to the groove signal is a slight error (for example a few % or so of a sampling period T). Thus, it is difficult to determine whether the phase error is in the positive direction or in the negative direction with only one piece of data, and there is a strong possibility of an error occurring in bit value determination.

Thus, as described earlier with reference to FIG. 4, the recording device records the groove signal to which consecutive errors in an identical direction are set in a continuous groove signal section (for example t1 to t2 shown in FIG. 4) for a certain period. The reproducing device determines the direction in which the phase error is set in the certain groove signal section by an integrating process that sequentially adds the errors in the section.

The reproducing device integrates the phase error index value ($\Delta\tau$) represented by the above equation (Equation 1) in a continuous groove signal section (for example t1 to t2 shown in FIG. 4) for a certain period, and makes a determination shown in FIG. 7(3). Specifically, the determination of the presence or absence and the direction of a phase error is made by comparing a result ($\Sigma\Delta\tau$) of the integration of the phase error index value ($\Delta\tau$) with threshold values Th1 and Th2 as follows.

$Th1 < \Sigma\Delta\tau < Th2 \rightarrow$ no phase error $\Sigma\Delta\tau \leq Th1 \rightarrow$ with a phase error in the positive direction $\Sigma\Delta\tau \geq Th2 \rightarrow$ with a phase error in the negative direction    (Equation 2)

The determination of the presence or absence and the direction of a phase error is made according to the above determining equation (Equation 2).

Figure 8:
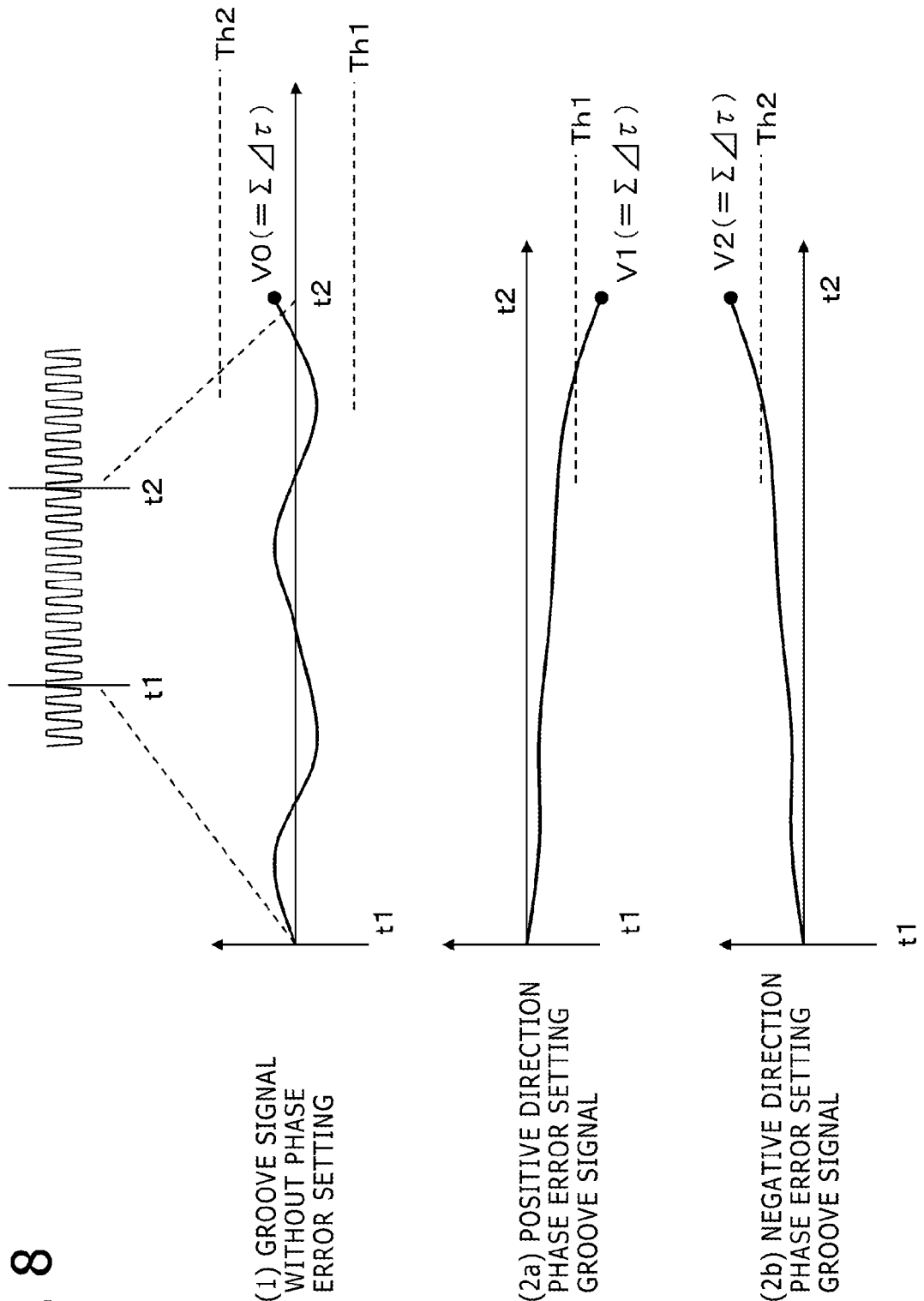
FIG. 8 is a diagram of assistance in explaining an example of processes of obtaining additional information by signal analysis processing on groove signals which processing is performed by the information reproducing device according to one embodiment of the present invention.

FIG. 8 is a diagram of assistance in explaining a concrete example of a process of comparing the result ($\Sigma\Delta\tau$) of the integration of the phase error index value ($\Delta\tau$) with the threshold values.

FIG. 8 shows an example of the following three patterns.
(1) a groove signal without a phase error setting
(2a) a positive direction phase error setting groove signal
(2b) a negative direction phase error setting groove signal An example of the process of comparing the result ($\Sigma\Delta\tau$) of the integration of the phase error index value ($\Delta\tau$) with the threshold values (Th1 and Th2) for the signals of these three patterns is shown.

FIG. 8(1) represents an example in which the groove signal in the signal section t1 to t2 is a groove signal to which no phase error is set. In this case, the phase error index value ($\Delta\tau$) of each zero crossing point occurs in a substantially balanced manner in different directions without deviations occurring on one side. As a result, a result ($\Sigma\Delta\tau$)=V0 of the integration of the phase error index value ($\Delta\tau$) in the signal section t1 to t2 is in a range of the threshold value Th1 to the threshold value Th2 set in advance.

This corresponds to a case in which the phase error index value ($\Delta\tau$) is calculated according to the above-described equation, that is, $\Delta\tau = ((Y_k)(X_{k-1})) - ((Y_{k-1})(X_k))$ by applying measured values $X_{11}$ and $X_{12}$ measured according to the groove signal without a phase error which groove signal is indicated by a dotted line in FIG. 7(2), for example, and a result ($\Sigma\Delta\tau$)=V0 of the integration thereof is calculated.

FIG. 8(2a) represents an example in which the groove signal in the signal section t1 to t2 is a groove signal to which a phase error in the positive direction is set. This corresponds to the example described with reference to FIG. 7. In this case, the phase error index value ($\Delta\tau$) of each zero crossing point has a deviation occurring on one side. As a result, a result ($\Sigma\Delta\tau$)=V1 of the integration of the phase error index value ($\Delta\tau$) in the signal section t1 to t2 is a value equal to or less than the threshold value Th1 set in advance.

FIG. 8(2b) represents an example in which the groove signal in the signal section t1 to t2 is a groove signal to which a phase error in the negative direction is set. Also in this case, the phase error index value ($\Delta\tau$) of each zero crossing point occurs with deviations occurring on one side. The opposite deviations from FIG. 8(2a) occur. As a result, a result ($\Sigma\Delta\tau$)=V2 of the integration of the phase error index value ($\Delta\tau$) in the signal section t1 to t2 is a value equal to or more than the threshold value Th2 set in advance.

Thus, determination can be made for each of the groove signals of the three patterns by comparing the result ($\Sigma\Delta\tau$) of the integration of the phase error index value ($\Delta\tau$) with the threshold values. Specifically, $Th1 < \Sigma\Delta\tau < Th2 \rightarrow$ no phase error $\Sigma\Delta\tau < Th1 \rightarrow$ with a phase error in the positive direction $\Sigma\Delta\tau > Th2 \rightarrow$ with a phase error in the negative direction The determination of the presence or absence and the direction of a phase error can be made according to the above determining equation.

An example of the process of calculating the phase error index value ($\Delta\tau$) when the positive direction phase error setting groove signal forms a line slanting downward to the right at a zero crossing point has been described with reference to FIG. 7. However, a zero crossing point occurs for two kinds of lines, that is, a line slanting downward to the right and a line slanting upward to the right. However, lines slanting downward to the right and lines slanting upward to the right in drawings respectively correspond to different directions of deflection from a track direction in the flat surface of the disk.

A concrete example of processes of calculating the phase error index value ($\Delta\tau$) in the positive direction phase error setting groove signal and the negative direction phase error setting groove signal for each of these patterns will be described with reference to FIG. 9 and FIG. 10.

Figure 9:
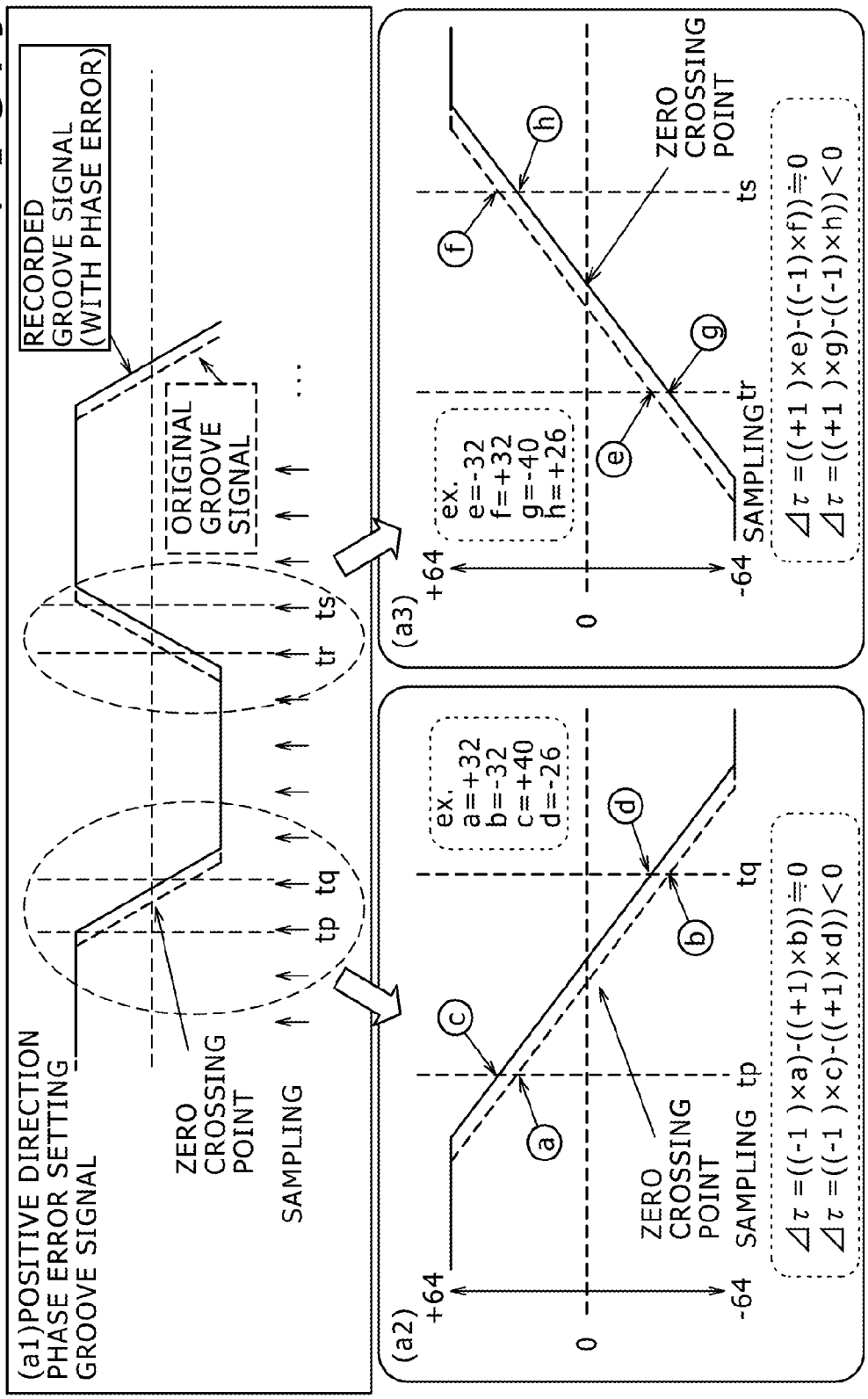
FIG. 9 is a diagram of assistance in explaining an example of a process of obtaining additional information by signal analysis processing on a groove signal which processing is performed by the information reproducing device according to one embodiment of the present invention.

FIG. 9 is a diagram of assistance in explaining a concrete example of a process of calculating the phase error index value ($\Delta\tau$) for the positive direction phase error setting groove signal.

FIG. 9(a1) shows the groove signal to which a phase error is set in the positive direction (track traveling direction) by a solid line. A dotted line indicates the groove signal without a phase error for reference.

FIGS. 9(a2) and 9(a3) are enlarged views of two patterns in the neighborhoods of zero crossing points of the groove signal. The following examples are shown:
(a2) an example of a process for the neighborhood of a line slanting downward to the right; and
(a3) an example of a process for the neighborhood of a line slanting upward to the right.

Incidentally, a dotted line indicates an example of the groove signal without a phase error which example is shown as reference data.

(a2) In the example of the process for the neighborhood of the line slanting downward to the right, two pieces of sampling data at sampling points tp and tq before and after a zero crossing point in the groove signal to which a phase error in the positive direction is set, which groove signal is indicated by a solid line, are used for phase error detection.

FIG. 9(a2) shows an example of measured values at the sampling points tp and tq in each of the groove signal to which the phase error in the positive direction is set (solid line) and the groove signal without a phase error (dotted line).

The measured values of the groove signal to which the phase error in the positive direction is set (solid line) are as follows.
    sampling time tp: a measured value c=+40
    sampling time tq: a measured value d=−26
The measured values of the groove signal without a phase error (dotted line) are as follows.
    sampling time tp: a measured value a=+32
    sampling time tq: a measured value b=−32
The above measured values, for example, are obtained from the positional relation of the lines, that is, the solid line and the dotted line.

A phase error index value ($\Delta\tau$) is calculated by applying the equation (Equation 1) described earlier on the basis of these measured values.

The measured values of the groove signal to which the phase error in the positive direction is set (solid line) are as follows.
    sampling time tp: a measured value c=+40
    sampling time tq: a measured value d=−26
When these measured values are applied, $$\Delta\tau = ((Y_k)(X_{k-1})) - ((Y_{k-1})(X_k))$$
$$= ((-1)(+40)) - ((+1)(-26))$$
$$= -14 < 0$$

A value less than zero is thus calculated.
This corresponds to FIG. 8(2*a*).
On the other hand, the measured values of the groove signal without a phase error (dotted line) are as follows.
    sampling time tp: a measured value a=+32
    sampling time tq: a measured value b=−32
When these measured values are applied, $$\Delta\tau = ((Y_k)(X_{k-1})) - ((Y_{k-1})(X_k))$$
$$= ((-1)(+32)) - ((+1)(-32))$$
$$= 0$$

Zero is thus calculated.
This corresponds to FIG. 8(1).
Description will next be made of the example of the process for the neighborhood of the line slanting upward to the right in FIG. 9(*a*3). FIG. 9(*a*3) represents an example in which the line of the groove signal in the neighborhood of a zero crossing point slants upward to the right. FIG. 9(*a*3) also shows an example of measured values at sampling points tr and ts in each of the groove signal to which the phase error in the positive direction is set (solid line) and the groove signal without a phase error (dotted line).

The measured values of the groove signal to which the phase error in the positive direction is set (solid line) are as follows.
    sampling time tr: a measured value g=−40
    sampling time ts: a measured value h=+26
The measured values of the groove signal without a phase error (dotted line) are as follows.
    sampling time tr: a measured value e=−32
    sampling time ts: a measured value f=+32
The above measured values, for example, are obtained from the positional relation of the lines, that is, the solid line and the dotted line.

A phase error index value ($\Delta\tau$) is calculated by applying the equation (Equation 1) described earlier on the basis of these measured values.

The measured values of the groove signal to which the phase error in the positive direction is set (solid line) are as follows.
    sampling time tr: a measured value g=−40
    sampling time ts: a measured value h=+26
When these measured values are applied, $$\Delta\tau = ((Y_k)(X_{k-1})) - ((Y_{k-1})(X_k))$$
$$= ((+1)(-40)) - ((-1)(+26))$$
$$= -14 < 0$$

A value less than zero is thus calculated.
This corresponds to FIG. 8(2*a*).
On the other hand, the measured values of the groove signal without a phase error (dotted line) are as follows.
    sampling time tp: a measured value e=−32
    sampling time tq: a measured value f=+32
When these measured values are applied, $$\Delta\tau = ((Y_k)(X_{k-1})) - ((Y_{k-1})(X_k))$$
$$= ((+1)(-32)) - ((-1)(+32))$$
$$= 0$$

Zero is thus calculated.
This corresponds to FIG. 8(1).
Thus, in either of the case of a line at a zero crossing point slanting upward to the right and the case of a line at a zero crossing point slanting downward to the right, the phase error index value ($\Delta\tau$) calculated on the basis of the measured values of two points sandwiching the zero crossing point of the groove signal to which the phase error in the positive direction is set has a value smaller than the phase error index value ($\Delta\tau$) calculated on the basis of the measured values of the groove signal to which no phase error is set.

An integration result V1 as shown in FIG. 8(2*a*) described earlier is obtained by integrating the phase error index value ($\Delta\tau$) in a predetermined measurement section. This integration result V1 is compared with the threshold value Th1 set in advance. It can be determined that the phase error in this measurement section is in the positive direction (track traveling direction) when the following result is obtained.

$$V1 \leq Th1$$

Figure 10:
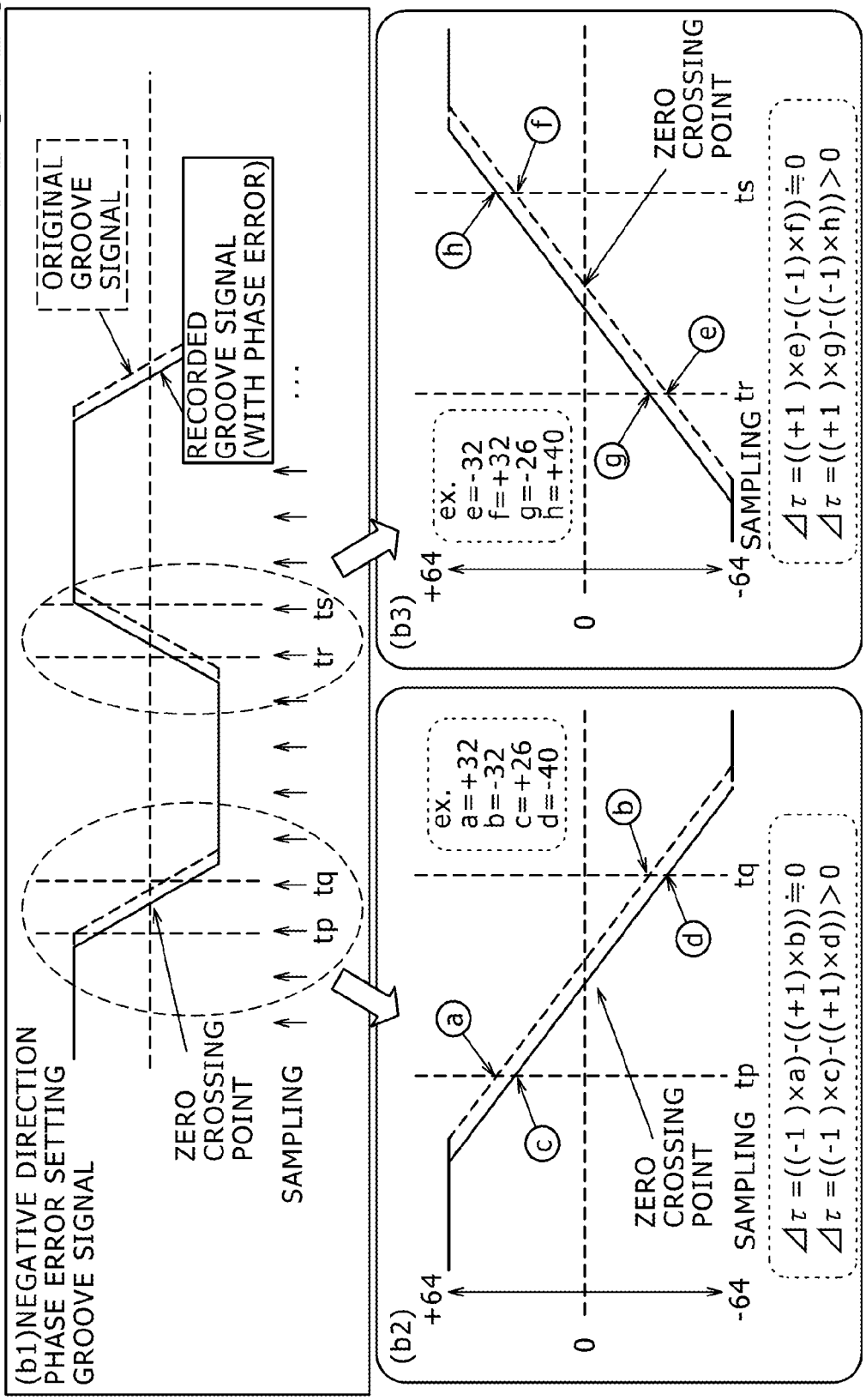
FIG. 10 is a diagram of assistance in explaining an example of a process of obtaining additional information by signal analysis processing on a groove signal which processing is performed by the information reproducing device according to one embodiment of the present invention.

FIG. 10 is a diagram of assistance in explaining a concrete example of a process of calculating the phase error index value ($\Delta\tau$) for the negative direction phase error setting groove signal.

FIG. 10(*b*1) shows the groove signal to which a phase error is set in the negative direction (track reverse direction) by a solid line. A dotted line indicates the groove signal without a phase error for reference.

FIGS. 10(*b*2) and 10(*b*3) are enlarged views of two patterns in the neighborhoods of zero crossing points of the groove signal. The following examples are shown:
    (*b*2) an example of a process for the neighborhood of a line slanting downward to the right; and
    (*b*3) an example of a process for the neighborhood of a line slanting upward to the right.

Incidentally, a dotted line indicates an example of the groove signal without a phase error which example is shown as reference data.

(b2) In the example of the process for the neighborhood of the line slanting downward to the right, two pieces of sampling data at sampling points tp and tq before and after a zero crossing point in the groove signal to which a phase error in the negative direction is set, which groove signal is indicated by a solid line, are used for phase error detection.

FIG. 10(b2) shows an example of measured values at the sampling points tp and tq in each of the groove signal to which the phase error in the negative direction is set (solid line) and the groove signal without a phase error (dotted line).

The measured values of the groove signal to which the phase error in the negative direction is set (solid line) are as follows.

sampling time tp: a measured value c=+26
sampling time tq: a measured value d=−40

The measured values of the groove signal without a phase error (dotted line) are as follows.

sampling time tp: a measured value a=+32
sampling time tq: a measured value b=−32

The above measured values, for example, are obtained from the positional relation of the lines, that is, the solid line and the dotted line.

A phase error index value ($\Delta\tau$) is calculated by applying the equation (Equation 1) described earlier on the basis of these measured values.

The measured values of the groove signal to which the phase error in the negative direction is set (solid line) are as follows.

sampling time tp: a measured value c=+26
sampling time tq: a measured value d=−40

When these measured values are applied, $$\Delta\tau = ((Y_k)(X_{k-1})) - ((Y_{k-1})(X_k))$$
$$= ((-1)(+26)) - ((+1)(-40))$$
$$= +14 > 0$$

A value larger than zero is thus calculated.
This corresponds to FIG. 8(2b).
On the other hand, the measured values of the groove signal without a phase error (dotted line) are as follows.

sampling time tp: a measured value a=+32
sampling time tq: a measured value b=−32

When these measured values are applied, $$\Delta\tau = ((Y_k)(X_{k-1})) - ((Y_{k-1})(X_k))$$
$$= ((-1)(+32)) - ((+1)(-32))$$
$$= 0$$

Zero is thus calculated.
This corresponds to FIG. 8(1).

Description will next be made of the example of the process for the neighborhood of the line slanting upward to the right in FIG. 10(b3). FIG. 10(b3) represents an example in which the line of the groove signal in the neighborhood of a zero crossing point slants upward to the right. FIG. 10(b3) also shows an example of measured values at sampling points tr and ts in each of the groove signal to which the phase error in the negative direction is set (solid line) and the groove signal without a phase error (dotted line).

The measured values of the groove signal to which the phase error in the negative direction is set (solid line) are as follows.

sampling time tr: a measured value g=−26
sampling time ts: a measured value h=+40

The measured values of the groove signal without a phase error (dotted line) are as follows.

sampling time tr: a measured value e=−32
sampling time ts: a measured value f=+32

The above measured values, for example, are obtained from the positional relation of the lines, that is, the solid line and the dotted line.

A phase error index value ($\Delta\tau$) is calculated by applying the equation (Equation 1) described earlier on the basis of these measured values.

The measured values of the groove signal to which the phase error in the positive direction is set (solid line) are as follows.

sampling time tr: a measured value g=−26
sampling time ts: a measured value h=+40

When these measured values are applied, $$\Delta\tau = ((Y_k)(X_{k-1})) - ((Y_{k-1})(X_k))$$
$$= ((+1)(-26)) - ((-1)(+40))$$
$$= +14 > 0$$

A value larger than zero is thus calculated.
This corresponds to FIG. 8(2b).
On the other hand, the measured values of the groove signal without a phase error (dotted line) are as follows.

sampling time tp: a measured value e=−32
sampling time tq: a measured value f=+32

When these measured values are applied, $$\Delta\tau = ((Y_k)(X_{k-1})) - ((Y_{k-1})(X_k))$$
$$= ((+1)(-32)) - ((-1)(+32))$$
$$= 0$$

Zero is thus calculated.
This corresponds to FIG. 8(1).

Thus, in either of the case of a line at a zero crossing point slanting upward to the right and the case of a line at a zero crossing point slanting downward to the right, the phase error index value ($\Delta\tau$) calculated on the basis of the measured values of two points sandwiching the zero crossing point of the groove signal to which the phase error in the negative direction is set has a value larger than the phase error index value ($\Delta\tau$) calculated on the basis of the measured values of the groove signal to which no phase error is set.

An integration result V2 as shown in FIG. 8(2b) described earlier is obtained by integrating the phase error index value ($\Delta\tau$) in a predetermined measurement section. This integration result V2 is compared with the threshold value Th2 set in advance. It can be determined that the phase error in this measurement section is in the negative direction (track reverse direction) when the following result is obtained.

$$V2 \geq Th2$$

3. Configuration and Processes of Information Recording Device

When the additional information superimposed on the groove signal is a cryptographic key, for example, the information recording and reproducing device of the user can read the groove signal recorded on the loaded disk, and obtain the cryptographic key. Further, contents obtained from a server, for example, can be encrypted by applying the obtained cryptographic key, and recorded on the disk.

Alternatively, it is also possible for a server to provide contents encrypted by applying an identical cryptographic key to that recorded on the disk to the user device, to record the encrypted contents on the disk on the side of the user device, and in a subsequent reproducing process, to perform a decrypting and reproducing process by applying the cryptographic key obtained from the groove signal of the disk.

An example of the configuration and processes of an information recording device for performing a process of recording encrypted contents on the disk on which the cryptographic key is thus recorded in a state of being superimposed on the groove signal will be described with reference to FIG. 11.

Figure 11:
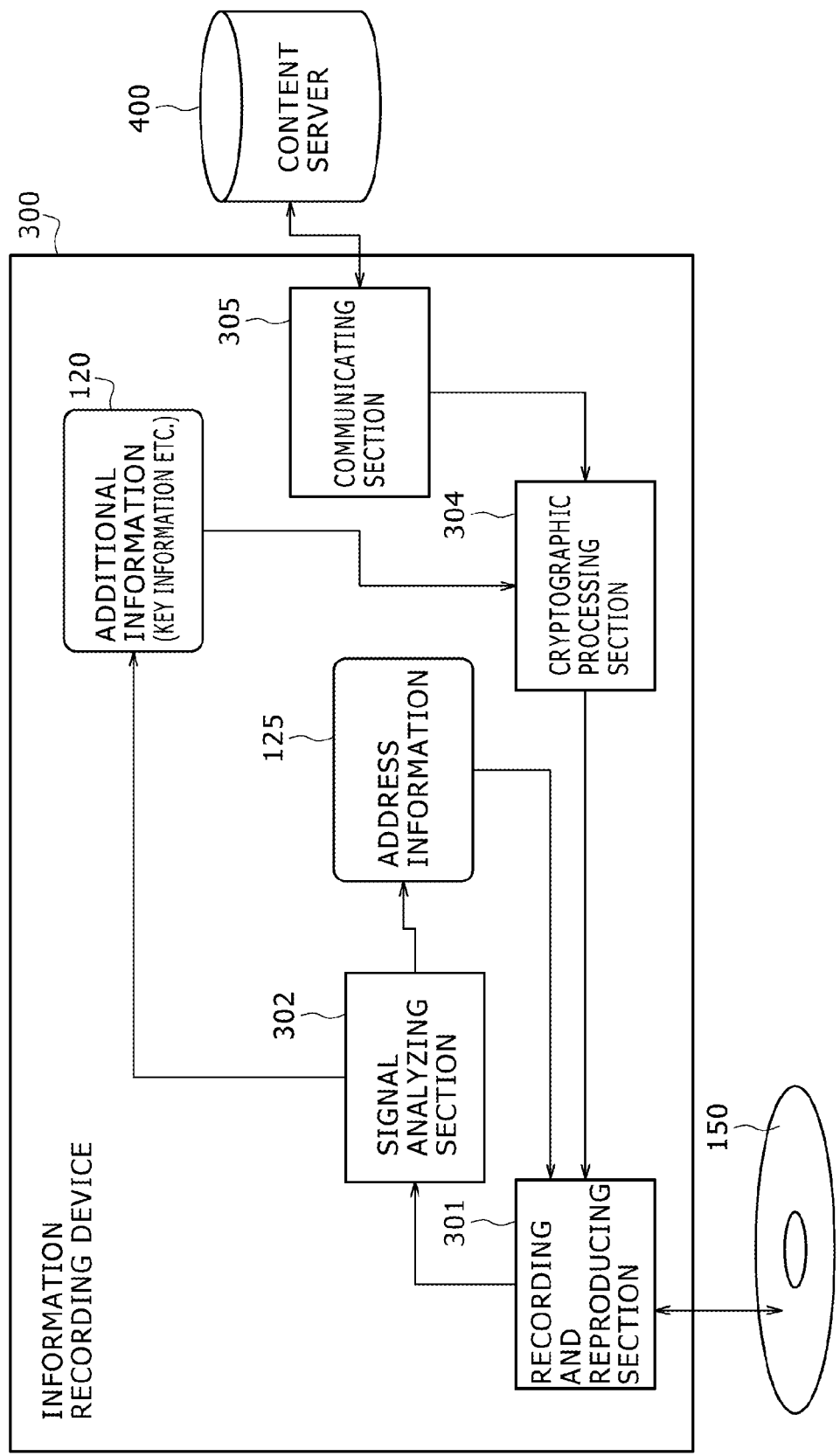
FIG. 11 is a diagram of assistance in explaining an example of configuration of an information recording device according to one embodiment of the present invention.

FIG. 11 is a block diagram showing an example of configuration of an information recording device 300 as a user device into which the above-described disk 150, that is, a disk 150 having a cryptographic key recorded as additional information in a groove signal is loaded, and which user device performs a process of recording encrypted contents on the disk 150.

As shown in FIG. 11, the information recording device 300 has a recording and reproducing section 301, a signal analyzing section 302, a cryptographic processing section 304, and a communicating section 305.

The recording and reproducing section 301 performs a process of reading the groove signal and recorded contents from the disk 150 and further recording contents.

The signal analyzing section 302 has a similar configuration and performs a similar process to those of the signal analyzing section 202 in the information reproducing device 200 described earlier with reference to FIG. 5 and FIG. 6. Specifically, a phase error is detected by demodulating and analyzing the groove signal input from the recording and reproducing section 301, and a constituent bit value of the additional information recorded in the groove signal is detected on the basis of the detected phase error.

Additional information 120 is obtained on the basis of the constituent bit information of the additional information detected in the signal analyzing section 302. For example, the additional information 120 is a cryptographic key, and is applied to a process of encrypting contents to be recorded on the disk 150. In addition, the additional information 120 is applied to a process of decrypting encrypted contents recorded on the disk 150.

Further, address information 125 as other additional information included in the groove signal is obtained from a result of the demodulation in the signal analyzing section 302. The address information 125 is used in processes of recording and reproducing data on the disk 150.

The information recording device 300 communicates with a content server 400 via the communicating section 305, and obtains contents from the content server 400. The obtained contents are either encrypted contents or plaintext contents to which an encrypting process has not been applied.

In the case of encrypted contents, the encrypted contents can be decrypted by the cryptographic key read from the groove signal of the disk 150. When such encrypted contents are received from the server, the received encrypted contents are recorded onto the disk 150 via the recording and reproducing section 301.

In addition, when plaintext contents to which an encrypting process has not been applied are received from the content server 400, the cryptographic processing section 304 performs an encrypting process by applying the cryptographic key as the additional information 120 read from the groove signal of the disk 150. Consequently, the generated encrypted contents are recorded onto the disk 150 via the recording and reproducing section 301.

When the encrypted contents recorded on the disk 150 are to be reproduced, the encrypted contents are read from the disk 150, and the cryptographic key is read from the groove signal. The encrypted contents are decrypted by applying the read cryptographic key, and a reproducing process is performed. This process is similar to the process of the information reproducing device 200 described earlier with reference to FIG. 5.

Incidentally, while contents to be recorded on the disk are obtained from the content server 400 via the communicating section 305 in the configuration shown in FIG. 11, the source from which the contents are obtained is not limited to servers, but various settings can be made, including broadcasting, other information processing devices, and other media. Contents input via interfaces as content input sections corresponding to these sources can be recorded as encrypted contents onto the disk.

When the information recording device 300 shown in FIG. 11 records encrypted contents onto the disk, the encrypted contents and the cryptographic key applied to the decryption of the encrypted contents are stored en bloc on one disk. Thus, even when the encrypted contents are output and copied to another medium, for example, the cryptographic key cannot be used. Therefore unauthorized use of the contents can be prevented effectively.

4. Other Embodiments

As for a phase error setting mode according to a bit value in the superimposition recording of additional information on a groove signal, various settings can be made in addition to the configuration described earlier with reference to FIG. 4.

The example described with reference to FIG. 4 is an example in which the groove signal is recorded with the following settings, and in which bit value determination is made on the basis of these phase errors:

a groove signal to which a phase error in the positive direction is set in the case of a bit=1; and a groove signal to which a phase error in the negative direction is set in the case of a bit=0.

Figure 12:
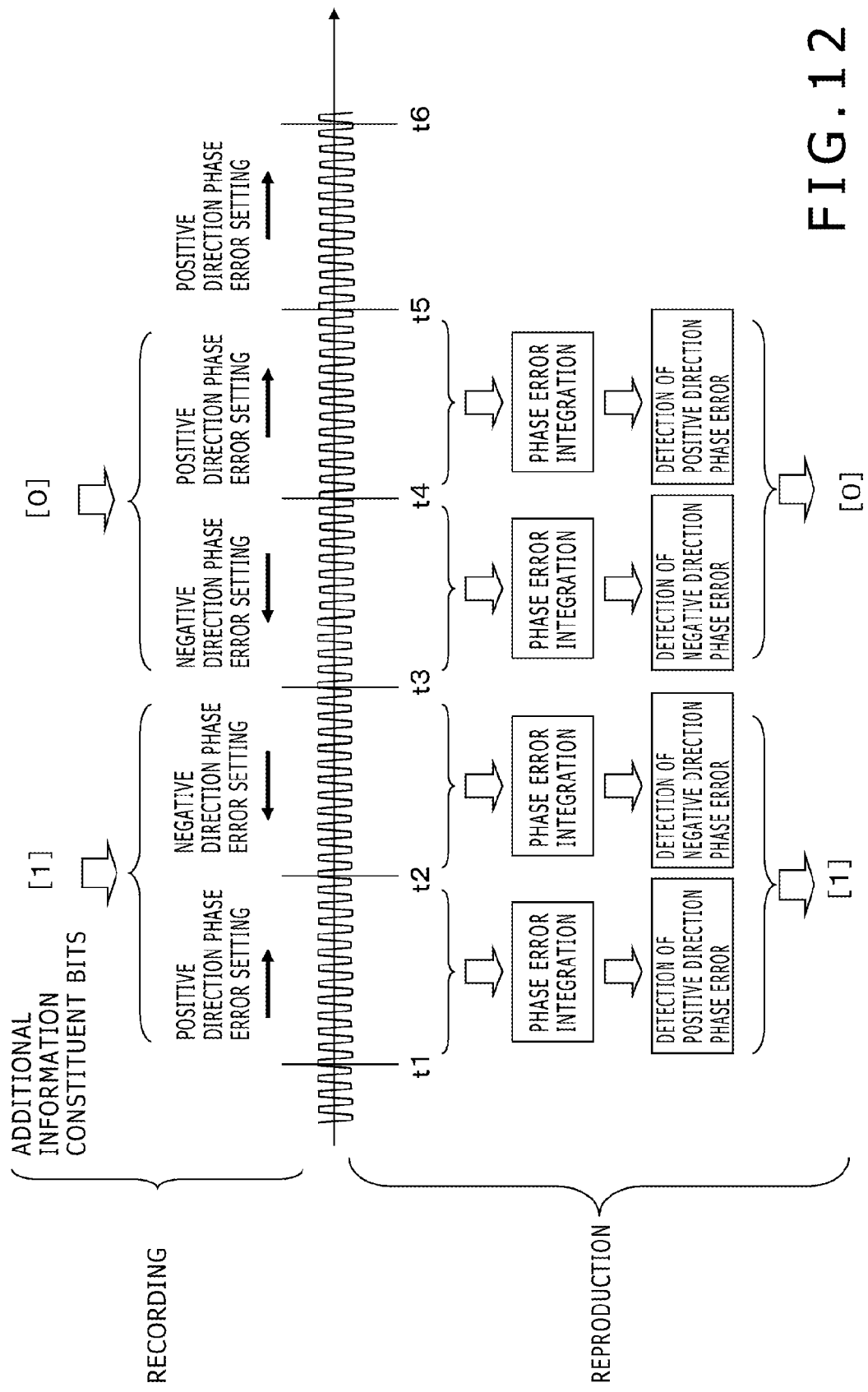
FIG. 12 is a diagram of assistance in explaining an example of a process of recording a phase error setting groove signal and a process of reproducing the phase error setting groove signal according to one embodiment of the present invention.

Various settings can be made for correspondences between bit values and phase errors. Settings opposite from the above, settings associating bit values with a plurality of phase error patterns, and the like can be made. FIG. 12 shows an example thereof.

As with FIG. 4 described earlier, FIG. 12 is a diagram showing an example of a process of recording the groove signal and a process of reproducing the groove signal. The example of FIG. 12 represents an example in which the groove signal is recorded with settings as follows:

a preceding positive direction phase error setting groove signal and a succeeding negative direction phase error setting groove signal in the case of a bit=1; and a preceding negative direction phase error setting groove signal and a succeeding positive direction phase error setting groove signal in the case of a bit=0.

The example shown in FIG. 12 represents an example of settings as follows:

t1 to t2: a positive direction phase error setting groove signal t2 to t3: a negative direction phase error setting groove signal A bit value=1 is represented by the groove signals in the section t1 to t3.

t3 to t4: a negative direction phase error setting groove signal t4 to t5: a positive direction phase error setting groove signal A bit value=0 is represented by the groove signals in the section t3 to t5.

As shown in an upper part of FIG. 12, in the process of recording the groove signal, the groove signal having transfer errors according to the above settings is generated and recorded in the case where a constituent bit of the additional information has a bit value=1 and in the case where a constituent bit of the additional information has a bit value=0.

In a reproducing process, a reproducing device reads the groove signal at predetermined sampling time (T) intervals, and performs an integrating process that sequentially adds the value of the signal read at each sampling time, as shown in a lower part of FIG. 12. The direction (positive or negative) of the phase error of the groove signal read in a certain section (for example t1 to t2) is determined by the integrating process.

For example, the reproducing device performs the following process.

t1 to t2: Results of determination of a phase error on the basis of the read groove signal are accumulated (integrated), and it is determined that a phase error in the positive direction is set in the section.

t2 to t3: Results of determination of a phase error on the basis of the read groove signal are accumulated (integrated), and it is determined that a phase error in the negative direction is set in the section.

A bit value [1] is determined on the basis of the detection of a combination of the preceding positive direction phase error setting groove signal and the succeeding negative direction phase error setting groove signal in the section t1 to t3.

Next, t3 to t4: Results of determination of a phase error on the basis of the read groove signal are accumulated (integrated), and it is determined that a phase error in the negative direction is set in the section.

t4 to t5: Results of determination of a phase error on the basis of the read groove signal are accumulated (integrated), and it is determined that a phase error in the positive direction is set in the section.

A bit value [0] is determined on the basis of the detection of a combination of the preceding positive direction phase error setting groove signal and the succeeding negative direction phase error setting groove signal in the section t3 to t5.

By performing such a process, all of bit values constituting a key of 64 bits or 128 bits, for example, can be obtained correctly.

Incidentally, when the phase error setting direction is set in such a manner as [+] [−] [+] [−] [+] [−], there occurs a possibility that a preceding groove signal section and a succeeding groove signal section cannot be distinguished from each other. However, this problem can be solved by using signal sections in which no phase error is set, for example. Letting [0] be a section in which no phase error is set, for example, a groove signal with the following settings is recorded.

[+] [−] [0] [+] [−] [0] [+] [−] [0] [−] [+]

Such a signal is recorded, and [0] is used as a delimiter signal.

This setting makes it possible to determine which of a pair of [+] and [−] precedes in the groove signal at a time of reproduction. In the case of the above signal, a process of determining the following bit string is made possible.

1110 . . .

Incidentally, the example shown in FIG. 12 has been described as a configuration in which a bit value (0, 1) is identified by an arrangement of two different phase error setting groove signals, that is, the positive phase error setting groove signal and the negative phase error setting groove signal. However, various other settings can be made, including the following settings:

[+] [+] [−] represent a bit value=1; and

[−] [−] [+] represent a bit value=0.

The present invention has been explained above in detail with reference to specific embodiments thereof. It is obvious, however, that modifications and substitutions in the embodiments may be made by those skilled in the art without departing from the spirit of the present invention. That is, the present invention has been disclosed in a form that is illustrative and is not to be construed in a restrictive manner. In order to determine the spirit of the present invention, the section of claims is to be considered.

In addition, the series of processes described in the specification can be performed by hardware, software, or a composite configuration of both hardware and software. When processing is performed by software, a program in which a processing sequence is recorded can be executed after being installed into a memory within a computer incorporated in dedicated hardware, or executed after the program is installed on a general-purpose computer capable of performing various kinds of processing. For example, the program can be recorded on a recording medium in advance. In addition to being installed from a recording medium onto a computer, the program can be received via a network such as a LAN (Local Area Network), the Internet or the like, and installed onto a recording medium such as a built-in hard disk or the like.

It is to be noted that the various kinds of processing described in the specification may be not only performed in time series according to the description but also performed in parallel or individually according to the processing power of a device performing the processing or necessity. In addition, a system in the present specification is a logical set configuration of a plurality of devices, and is not limited to a system in which the devices of respective configurations are within an identical casing.

INDUSTRIAL APPLICABILITY

As described above, according to the configuration of one embodiment of the present invention, superimposition recording of highly secret additional information such as a cryptographic key in a groove signal recorded on a disk, which superimposition recording realizes both readout difficulty and high-precision readout, can be performed. The groove signal to which a phase error corresponding to a bit value is set is recorded at a time of recording of the additional information, and at a time of readout of the additional information, the phase error of the groove signal in a predetermined section is subjected to an integrating process and the direction of the phase error of the groove signal within each section is determined. The recording and reproduction of the additional information for increasing readout difficulty and realizing high-precision readout is realized by such processes.

DESCRIPTION OF REFERENCE NUMERALS

100 Recording medium manufacturing device
102 Recording signal generating section
103 Recording section
120 Additional information
122 Modulated signal generating portion
123 Phase error setting signal generating portion
125 Address information
130 Master disk
150 Disk
201 Reproducing section
202 Signal analyzing section
204 Decryption processing section
221 Demodulating portion
222 Phase error detecting portion
223 Bit value determining portion
301 Recording and reproducing section
302 Signal analyzing section
304 Cryptographic processing section

The invention claimed is:

1. A recording medium manufacturing device comprising:
a recording signal generating section configured to generate a groove signal as a recording signal for recording additional information; and
a recording section configured to record the recording signal generated by said recording signal generating section onto a master disk;
wherein said recording signal generating section determines a phase error setting mode corresponding to each bit value constituting said additional information, and
said recording signal generating section generates the recording signal to which a phase error corresponding to each bit value constituting said additional information is set in a predetermined section unit of said recording signal.

2. The recording medium manufacturing device according to claim 1,
wherein said recording signal generating section generates the recording signal in which a direction or a combination of directions of the phase error set in said groove signal is set in different modes according to a case of a bit value of said additional information being zero and a case of the bit value of said additional information being one.

3. The recording medium manufacturing device according to claim 1 or 2,
wherein said additional information is information including a cryptographic key applied to a process of encrypting contents to be recorded on said disk or a process of decrypting the contents.

4. An information recording medium manufacturing method performed in a recording medium manufacturing device, the information recording medium manufacturing method comprising:
a recording signal generating step of a recording signal generating section generating a groove signal as a recording signal for recording additional information; and
a recording step of a recording section recording the recording signal generated in said recording signal generating step onto a master disk;
wherein said recording signal generating step includes
a step of determining a phase error setting mode corresponding to each bit value constituting said additional information, and
a step of generating the recording signal to which a phase error corresponding to each bit value constituting said additional information is set in a predetermined section unit of said recording signal.

* * * * *